US005208697A

United States Patent [19]
Schaffner et al.

[11] Patent Number: 5,208,697
[45] Date of Patent: May 4, 1993

[54] MICROWAVE FREQUENCY RANGE ELECTRO-OPTIC MODULATOR WITH EFFICIENT INPUT COUPLING AND SMOOTH WIDEBAND FREQUENCY RESPONSE

[75] Inventors: James H. Schaffner, Chatsworth; Robert L. Joyce, Newbury Park; Caroline M. Gee, Los Angeles; James M. Schellenberg, Huntington Beach, all of Calif.

[73] Assignee: Hughes Aircraft Company, Los Angeles, Calif.

[21] Appl. No.: 502,377

[22] Filed: Mar. 30, 1990

[51] Int. Cl.$^5$ .................. G02B 5/174; G02B 6/10; G02B 5/14
[52] U.S. Cl. .................. 359/254; 359/315; 385/3; 385/14
[58] Field of Search ............ 350/96.13, 96.14; 330/4.3; 385/3, 8, 14; 359/254, 315

[56] References Cited

U.S. PATENT DOCUMENTS

| | | | |
|---|---|---|---|
| 3,944,950 | 3/1976 | Jacobs et al. | 333/31 R |
| 4,205,311 | 5/1980 | Kutaragi | 340/784 |
| 4,208,091 | 6/1980 | Cheo et al. | 350/96.13 |
| 4,448,479 | 5/1984 | Alferness | 350/96.14 |
| 4,553,810 | 11/1985 | Alferness et al. | 350/96.14 |
| 4,679,893 | 7/1987 | Ramer | |
| 4,709,978 | 12/1987 | Jackel | 350/96.14 |
| 4,866,406 | 9/1989 | Minakata et al. | 330/4.3 |
| 4,917,451 | 4/1990 | Chouicnard et al. | 350/96.14 |
| 4,973,140 | 11/1990 | Cheo et al. | 350/353 |
| 5,005,932 | 4/1991 | Schaffner et al. | 350/96.14 |

FOREIGN PATENT DOCUMENTS

0018150 10/1980 European Pat. Off. .
WO87/03383 6/1987 PCT Int'l Appl. .

OTHER PUBLICATIONS

J. H. Schaffner; "Analysis of a Millimeter . . . Periodic Electrode"; SPIE Proc. OSP-Pat, Jan. 17, 1990, L.A., Calif., pp. 101-110.

Nick Parsons; "Integrated Optics", Artech House, Inc., 1989; Principals of Modern Optical Systems.
Soo et al.; "A Study on the New Microstrip Magic Tee"; J. Korea Inst. Electron. Eng., vol. 17, #3, pp. 36–44, Jun. 1980, abst only.
Betts et al.; "High Sensitivity . . . in LiNbO$_3$"; Jnl. of Lightwave Tech., vol. 7, #12, pp. 2078-2083, Dec. 1989, abst.
Jalinsen et al.; "Integrated Optical Modulator . . . "; MFOC 1988 West Proc., Dec. 8, 1988, pp. 93-95; abst. only.
Conference Paper of 23rd International Congress on Electronics, published 1976, Italy, pp. 161-166, "Elec- (List continued on next page.)

Primary Examiner—Nelson Moskowitz
Attorney, Agent, or Firm—V. D. Duraiswamy; W. K. Denson-Low

[57] ABSTRACT

A travelling-wave Mach-Zehnder electro-optic modulator (10) for operation at microwave electrical input signal frequencies has an electrical modulation electrode structure (26,34) which constitutes a coplanar waveguide (24). An electrical input signal connector (80) is coupled to a microstrip line (38) having an output impedance which is significantly different from the input impedance of the waveguide (24). A Chebyshev impedance matching transformer (50) couples the input signal from the input connector (80) to the modulation electrode structure (26,34), while matching the output impedance of the microstrip line (38) to the input impedance of the waveguide (24) to maximize the coupling efficiency and minimize return loss. The modulator (10) is mounted on a block (70) of magnetically loaded epoxide material which absorbs spurious resonant microwave emissions, and enables the modulator (10) to operate with smooth frequency response over a wide range of microwave input frequencies.

6 Claims, 2 Drawing Sheets

OTHER PUBLICATIONS trooptical Modulator Using Microstrip Lines as Matching Networks", V. Andresciani et al.

Dolfi, "Traveling-wave 1.3-μm Interferometer Modulator with High Bandwidth, Low Drive Power, and Low Loss", Applied Optics, vol. 25, No. 15, 1 Aug. 1986, pp. 2479-2480.

Cross et al., "Microwave Integrated Optical Modulator", Appl. Phys. Lett. 44(5), 1 Mar. 1984, pp. 486-488.

Gibson et al., "Performance of High Frequency LiNbO$_3$ Fibre Pigtailed Mach-Zehnder Waveguide Intensity Modulators at 1.32 μm and 1.52 μm", Pilkington Guided Wave Optics, Barr and Stroud Ltd., Glasgow, Scotland.

Klopfenstein, "A Transmission Line Taper of Improved Design", Proceedings of the IRE, pp. 31-35.

Gupta et al., "Microstrip Lines and Slotlines", Artech House, 1979, p. 275.

Izutsu et al., "10 GHz Bandwidth Traveling-Wave LiNbO$_3$ Optical Waveguide Modulator", IEEE Journal of Quantum Electronics, vol. QE-14, No. 6, Jun. 1978, pp. 394-395.

Gee et al., "Traveling-Wave Electrooptic Modulator", Applied Optics, vol. 22, No. 13, 1 Jul. 1983, pp. 2034-2037.

SPIE, Optoelectronic Signal Processing for Phased-Array Antennas II, vol. 1217 Jan. 1990, "Analysis of a millimeter wave integrated electro-optic modulator with a periodic electrode", J. H. Schaffner.

MICROWAVE FREQUENCY RANGE ELECTRO-OPTIC MODULATOR WITH EFFICIENT INPUT COUPLING AND SMOOTH WIDEBAND FREQUENCY RESPONSE

GOVERNMENT RIGHTS

This invention was made with Government support under Contract No. N66604-87-C-1126 awarded by the Department of the Navy. The Government has certain rights in this invention.

BACKGROUND OF THE INVENTION

1. Field of the Invention

The present invention generally relates to the field of optical data communications, and more specifically to an electro-optic modulator for operation at microwave frequencies with efficient input coupling and smooth wideband frequency response.

2. Description of the Related Art

Transmission of data using optical carriers enables very high bandwidths and numbers of multiplexed channels with low signal loss and distortion. A coherent laser light beam is amplitude modulated with a data signal, and propagates to a remote receiver either directly through the atmosphere, or via a system of optical fibers and repeaters. The light beam may advantageously be modulated with electrical signals in the microwave frequency range using an electro-optic modulator such as a Mach-Zehnder modulator or optical coupler.

An electro-optic modulator based on a Mach-Zehnder interferometer generally includes a monolithic substrate formed of an electro-optic material such as lithium niobate ($LiNbO_3$) An optical waveguide is formed in the substrate having two arms or branches which extend generally in parallel with each other. The index of refraction of the material in the waveguide is higher than the index of refraction of the material of the substrate.

In the basic Mach-Zehnder modulator, the branches have equal lengths. In the absence of an applied electrical bias voltage, an input optical or light beam produced by a laser or the like applied to the waveguide divides equally between the branches. The optical signals propagating through the branches recombine at the optical output of the waveguide in phase with each other, such that their amplitudes are additive and an optical output signal which is essentially similar to the optical input signal appears at the output of the waveguide.

Application of a predetermined electrical bias voltage differential between the waveguide branches causes a differential in the indices of refraction of the two branches due to the electro-optic effect, with a corresponding differential in the effective optical lengths of the branches. At a bias voltage known in the art as $V\pi$, the effective optical lengths have varied to such an extent that the optical signals emerging from the branches are 180° out of phase with each other. The amplitudes of the signals combine subtractively, canceling each other out, such that a zero output is produced at the optical output. For most optical communication applications, it is desirable to bias the modulator at a voltage $V\pi/2$, which produces linear operation.

Some of the problems which have limited the high frequency broadband application of Mach-Zehnder electro-optic modulators are specific to the modulator electrodes. These include impedance mismatch losses at the modulator input, and the presence of spurious resonances at the modulator's frequency response.

A Mach-Zehnder electro-optic modulator of the type to which the present invention relates is described in a paper entitled "Traveling-wave 1.3-$\mu$m interferometer modulator with high bandwidth, low drive power, and low loss", by D. Dolfi, in Applied Optics, vol. 25, no. 15, August 1986, pp. 2479–2480. The device as disclosed includes a modulation signal source having a 50$\Omega$ output impedance which applies an electrical modulation input signal to a coplanar waveguide structure in the modulator with an input impedance of 22$\Omega$. The reflection loss at the input due to the impedance mismatch reduced the effective drive voltage to 61% of the source voltage. An attempt to eliminate the reflection and minimize ripples in the frequency response included connecting a 28$\Omega$ series resistance between the source and modulator. However, this reduced the effective drive voltage even further to 44% of the source voltage.

A similar device is disclosed in a paper entitled "Microwave integrated optical modulator", by P. Cross, Applied Physics Letters 44(5), Mar. 1, 1984, pp. 486–488. The reflection loss was essentially similar to that reported by Dolfi. Connection of a resistive network between the source and modulator to minimize ripples in the response reduced the effective drive voltage from 63% to 27%. The device further suffered from spurious resonant modes in the frequency response resulting from an undesired microstrip mode existing between the hot lead of the coplanar line and the metal package.

Another similar device is disclosed in a paper entitled "Traveling-wave electrooptic modulator", by C. Gee et al, in Applied Optics, vol. 22, no. 13, July 1983, pp. 2034–2037. A prominent feature of the modulator was a pronounced resonance at 5.5 GHz generated in the device package.

A further related device is disclosed in a paper entitled "10 GHz Bandwidth Traveling-Wave $LiNbO_3$ Optical Waveguide Modulator", by M. Izutsu et al, in IEEE Journal of Quantum Electronics, vol. QE-14, no. 6, June 1978, pp. 394–395. The device is a phase modulator, rather than an amplitude modulator, and achieved smooth frequency response using a symmetrical electrode configuration as a microwave waveguide.

SUMMARY OF THE INVENTION

The present invention provides a planar Mach-Zehnder interferometer electro-optic modulator assembly for modulating an optical light beam at a preferred, but not limiting, wavelength of 1.3 $\mu$m, using a traveling wave coplanar waveguide electrode structure suitable for operation in high microwave frequency fiber optic links. The problem of large impedance mismatch in conventional Mach-Zehnder modulators is due to inefficient input coupling. The present modulator overcomes this problem by incorporating a radio frequency (RF) impedance matching transformer and transitions to provide efficient coupling to a 50$\Omega$ system using industry standard connectors. The problem of spurious resonances in the modulator's frequency response results from a mismatch in the dielectric constant at the interface of the modulator substrate and the mounting structure which supports the modulator, since modulator substrates have been conventionally mounted on a plastic or ceramic block, or even suspended in air. The present modulator overcomes this problem by mounting the modulator substrate, which is preferably formed of lithium niobate, on a block of microwave absorbing material.

The present modulator assembly provides efficient RF coupling from a conventional 50Ω input connector to the modulator's RF/optical interaction region up to very high microwave frequencies for 1.3 μm optical wavelengths.

Travelling wave coplanar electrodes for lithium niobate modulators need low characteristic impedances (about 25Ω) because of the small electrode gap dimension (less than 12 μm for X-cut substrates) required to produce large enough electric fields for sufficient electro-optic phase modulation in each arm of the Mach-Zehnder interferometer at reasonable input drive powers (less than 100 mW for 50% modulation). Mach-Zehnder modulators reported in the prior art have no means for providing an RF impedance match in the modulator, with the resulting high values of reflection loss discussed above. The present invention incorporates a tapered coplanar waveguide impedance transformer, preferably a Chebyshev transformer, to bring the RF impedance level up to a desired value, in this case 50Ω. In addition, the substrate of the present modulator is cemented to a block of microwave waveguide absorbing material which eliminates the spurious resonances. Although the present invention is especially applicable to a Mach-Zehnder modulator configuration, the scope thereof includes application to other types of travelling wave electro-optic modulators, such as optical couplers.

More specifically, a travelling-wave Mach-Zehnder electro-optic modulator for operation at microwave electrical input signal frequencies has an electrical modulation electrode structure including a coplanar waveguide. An electrical input signal connector includes a microstrip line having an output impedance which is significantly different from the input impedance of the waveguide. A Chebyshev impedance matching transformer couples the input signal from the input connector to the modulation electrode, while matching the output impedance of the microstrip line to the input impedance of the waveguide to maximize the coupling efficiency and minimize return loss. The modulator is mounted on a block of magnetically loaded epoxide material which absorbs spurious resonant microwave emissions, and enables the modulator to operate with smooth frequency response over a wide range of microwave input frequencies.

These and other features and advantages of the present invention will be apparent to those skilled in the art from the following detailed description, taken together with the accompanying drawings, in which like reference numerals refer to like parts.

DETAILED DESCRIPTION OF THE INVENTION

Figure 1:
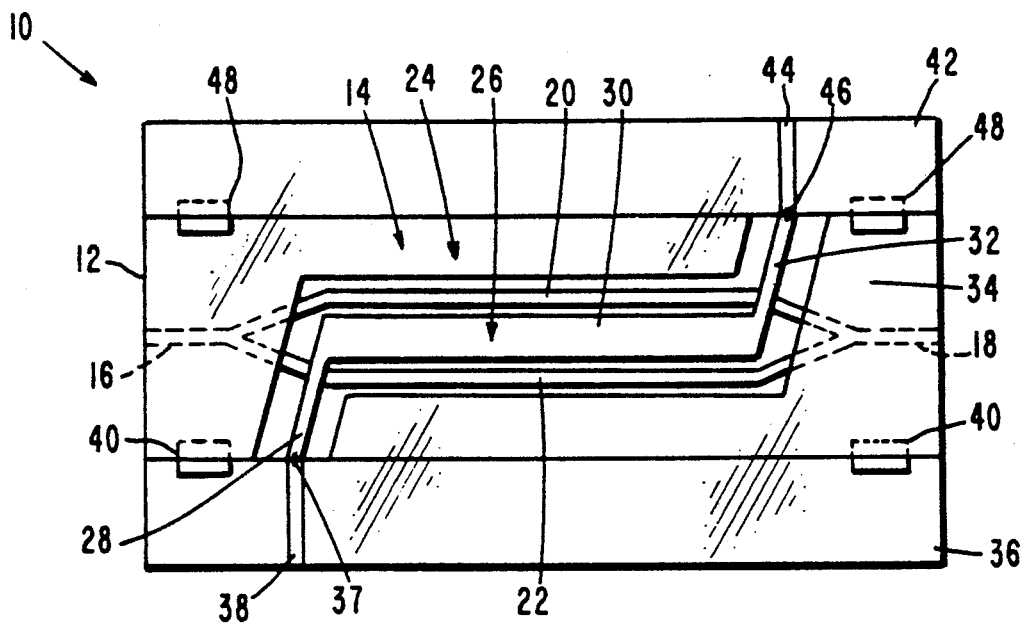
FIG. 1 is a schematic diagram of a Mach-Zehnder electro-optic modulator assembly embodying the present invention, illustrating optical and coplanar waveguides thereof to greatly enlarged scale.
Figure 3:
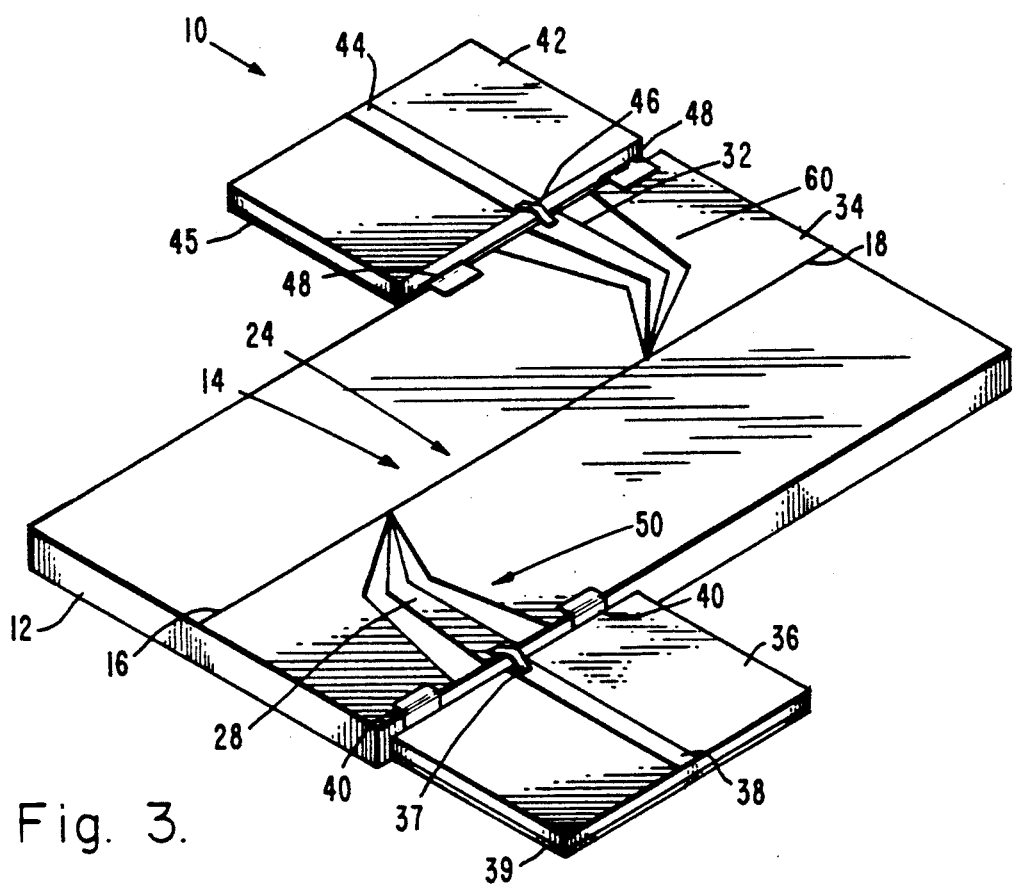
FIG. 3 is a perspective view of the present modulator assembly.

Referring now to FIGS. 1 and 3 of the drawing, a travelling wave electro-optic modulator assembly based on a planar Mach-Zehnder interferometer is generally designated as 10, and includes a substrate 12 formed of a material such as lithium niobate which exhibits the required electro-optic effect. An optical waveguide 14 is formed in the substrate 12 by a suitable process such as in-diffusion of titanium. The waveguide 14 includes an optical input 16 for receiving an optical signal as a beam of light for modulation by a microwave frequency input signal, and an optical output 18 for connection with an optical fiber link or the like. The optical input signal is produced by a semiconductor laser or other appropriate source (not shown) at a preferred, but not limiting, wavelength of 1.3 μm. The waveguide 14 further includes two branches 20 and 22, which diverge from the optical input 16 and extend generally parallel to each other. The branches 20 and 22 converge at their other ends into the optical output 18. In the basic Mach-Zehnder modulator configuration, the branches 20 and 22 have equal lengths.

The modulator 10 further includes an electrical coplanar waveguide 24 (in which the hot lead and ground plane are coplanar) for coupling an input microwave frequency electrical signal to the optical waveguide 14 to modulate the optical signal. The waveguide 24 includes a center conductor 26 having an input section 28, a central section 30, and an output section 32. A larger outer conductor 34 is provided around the center conductor 26, and electrically connected to a suitable reference potential such as ground.

A suitable bias voltage is applied from a source (not shown) to the center conductor 26 to bias the modulator 10 at a linear operating point. The microwave signal applied to the center conductor 26 causes the indices of refraction of the material in the branches 20 and 22 of the optical waveguide 14 to vary in an unequal manner due to the electro-optical effect in accordance with the index ellipsoid and trigonal crystal symmetry of the lithium niobate material, causing a differential in the phases of the signals propagating from the branches 20 and 22 into the optical output 18. This causes interference between the optical signals from the branches 20 and 22 to an extent corresponding to the instantaneous potential of the microwave input signal, a corresponding variation in the energy of the optical signal at the optical output 18, and thereby amplitude modulation of the optical signal.

Further illustrated in FIGS. 1 and 3 is a substrate 36 made of a block of a material such as alumina on which is formed a conventional microstrip input line 38 typically having an impedance of 50Ω. The adjacent edges of the substrates 12 and 36 are butted together, and the microstrip line 38 electrically connected to the input section 28 of the coplanar waveguide center connector 26 by a gold bond ribbon 37. The outer conductor 34 of the waveguide 24 is connected to a ground plane 39 of the microstrip line 38 by a gold bond ribbon 40 which is bent from the upper surface of the substrate 12 around the edge thereof to the lower surface of the substrate 36. A similar substrate 42, 50Ω microstrip output line 44, ground plane 45, and gold bond ribbons 46 and 48 are interconnected with the output section 32 of the waveguide center connector 26.

Figure 2:
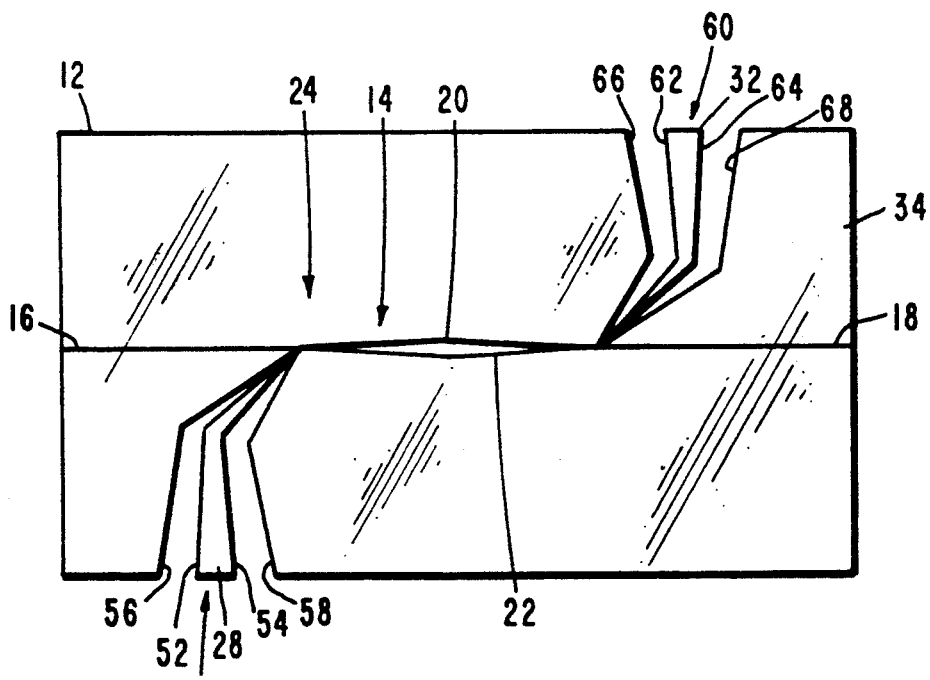
FIG. 2 is a plan view illustrating a Chebyshev impedance transformer configuration of the present modulator assembly.

In accordance with the present invention, impedance matching transformers fabricated on the electro-optic material substrate, are provided between the microstrip lines 38 and 44, which typically have impedances of about 50Ω, and the coplanar waveguide 24, which typically has an impedance on the order of 25Ω. This minimizes the impedance mismatch of the apparatus 10, enabling a maximum proportion of the microwave input signal to be coupled to the coplanar waveguide 24 for modulation of the optical signal. In FIG. 2, the waveguides 14 and 24 are not visible in detail due to the scale of the drawing. The electro-optical interaction length of the modulator will typically be on the order of 3.5 mm, although this dimension does not limit of the scope of the invention. An input impedance matching transformer 50 includes the input section 28 of the coplanar waveguide center conductor 26. Edges 52 and 54 of the input section 28 are shaped in relation to adjacent edges 56 and 58 of the outer conductor 34 of the coplanar waveguide 24 in such a manner that the characteristic impedance of the input section 28 smoothly transitions from 50Ω to 25Ω from the input end thereof which connects to the microstrip line 38, to the output end thereof which connects to the center section 30. A similar impedance matching transformer 60 is provided at the output end of the center connector 26, including edges 62 and 64 of the output section 32 of the center conductor 26, and adjacent edges 66 and 68 of the outer conductor 34.

The shapes of the edges 52, 54, 56, 58, 62, 64, 66 and 68 are preferably designed such that the transformers 50 and 60 will form Chebyshev transformers. The characteristic impedance along the input section 28 may be calculated as described in a paper entitled "A Transmission Line Taper of Improved Design", by R. Klopfenstein, in Proceedings of the IRE, 1956, pp. 31 to 35. The tapers of the edges as a function of characteristic impedance may be calculated as described in a textbook entitled "Microstrip Lines and Slotlines", by K. Gurta, Artech House, 1979, p. 275. The actual dimensions of the edges will vary depending on the particular application, but may be calculated using the Chebyshev relationships in these references. The Chebyshev taper configuration has been found to be optimum in that it has a minimum reflection coefficient in the pass band for a specified length of taper, and for a specified maximum magnitude reflection coefficient in the pass band, the taper has minimum length. A practical modulator arrangement has been found to be feasible having a return loss on the order of 20 dB.

Exemplary dimensions for the transformer 50 suitable for matching a 50Ω microstrip line 38 to the 25Ω coplanar waveguide 24 as described above are given in the following table, with the length of the centerline of the input section 28 from the microstrip line 38 to the central section 30 being 2723.7 μm. The length is divided into 21 equal increments of 129.7 μm each. The width W of the input section 28 between the edges 52 and 54, and the ground plane spacing D between the edges 56 and 58 of the outer conductor 34, are given in microns for each increment.

TABLE

| Point no. | W | D |
|---|---|---|
| Base | 254 | 1419.8 |
| 1 | 242.5 | 1274.3 |
| 2 | 231 | 1137.9 |
| 3 | 219.5 | 1011.5 |
| 4 | 208 | 895 |
| 5 | 196.5 | 788.8 |
| 6 | 185 | 691.8 |
| 7 | 173.5 | 605.2 |
| 8 | 162 | 527 |
| 9 | 150.5 | 457.7 |
| 10 | 139 | 395.7 |
| 11 | 127.5 | 340.5 |
| 12 | 116 | 291.7 |
| 13 | 104.5 | 248.2 |
| 14 | 93 | 209.2 |
| 15 | 81.5 | 174.4 |
| 16 | 70 | 143 |
| 17 | 58.5 | 114.5 |
| 18 | 47 | 88.5 |
| 19 | 35.5 | 64.5 |
| 20 | 24 | 42.3 |
| End | 24 | 36 |

Figure 4:
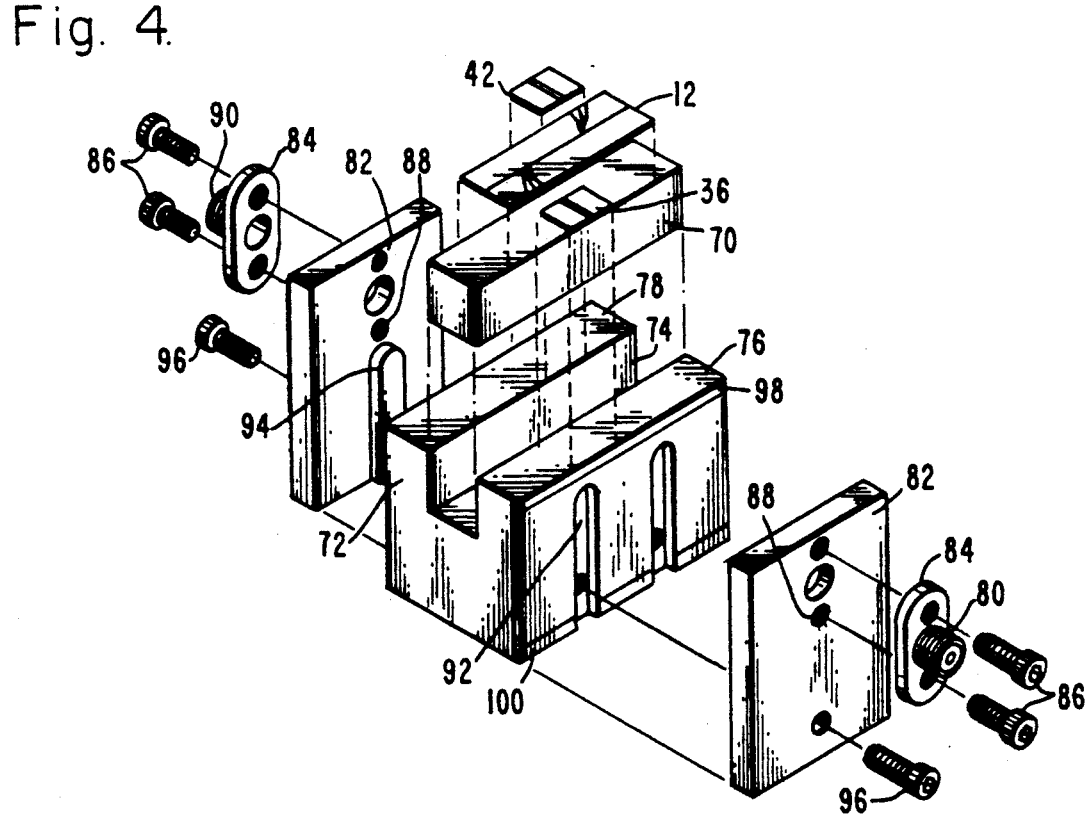
FIG. 4 is an exploded view of the present modulator assembly and a mechanical package for mounting the same.

In accordance with another important feature of the invention as illustrated in FIG. 4, the modulator substrate 12 is mounted on a block 70 of microwave energy absorbing material using cement or other appropriate means. The block 70 may preferably be made of a magnetically loaded epoxide material such as manufactured by the Emerson and Cumming Company under the tradename Eccosorb. The block 70 absorbs spurious resonant microwave emissions resulting from a mismatch in the dielectric constant at the interface of the substrate 12 and the block 70 itself, as well as any undesired microstrip or other resonant modes generated in the apparatus 10. Reduction of spurious resonances to a negligible level through absorption thereof by the block enables the modulator to operate over a wide range of microwave input frequencies with smooth frequency response. A nearly flat frequency response curve between 8 GHz and 18 GHz has been obtained using Eccosorb MF-124 material, which has an insertion loss of 149 dB/cm at 18 GHz. In addition to absorbing spurious microwave emissions, the Eccosorb material has the advantage of being easily machinable into any desired shape. Although the Eccosorb material has been found to provide excellent results, the scope of the invention includes the absorption of spurious resonant emissions using any suitable material.

A rugged package for mounting the apparatus 10 for support and interconnection with standard optical link elements is illustrated in FIG. 4, and includes a block 72 made of a metal or other rigid, durable material. The block 70 is designed to fit snugly into a deep groove 74 in the block 72 in which it is cemented or otherwise fixed in place. The substrates 36 and 42 are cemented to portions 76 and 78 respectively of the block 72 on opposite sides of the groove 74.

An input connector 80 which preferably has a conventional 50Ω SMA (small microwave connector, type A) configuration is fixed to a side plate 82 by means of a flange 84 and screws 86. The center lead of the connector 80 is electrically connected to the input microstrip line 38 through a hole 88 in the side plate 82 by means of a gold bond ribbon or the like, although not visible in the drawing. An output connector 90 is connected to the output microstrip line 44 by a similar arrangement, with the corresponding elements designated by the same reference numerals. The block 72 is formed on its opposite sides with vertical grooves 92, which have shapes conjugate to vertical ridges 94 formed on the side plates 82, enabling the elements of the assembly 10 to be quickly joined together in precise alignment and fixed together with screws 96. Further illustrated are pressure ridges 98 and 100 formed on the block 72 to ensure good electrical contact between the microstrip ground planes and SMA ground.

While an illustrative embodiment of the invention has been shown and described, numerous variations and alternate embodiments will occur to those skilled in the art, without departing from the spirit and scope of the invention. Accordingly, it is intended that the present invention not be limited solely to the specifically described illustrative embodiment. Various modifications are contemplated and can be made without departing from the spirit and scope of the invention as defined by the appended claims.

We claim:

1. An electro-optic modulator assembly comprising:
   a travelling-wave electro-optic modulator having an optical input, an optical output, and an electrical modulation electrode means having a predetermined input impedance, said modulation electrode means including a coplanar waveguide;
   input connector means for receiving an electrical modulation input signal, having a predetermined output impedance which is different from said predetermined input impedance, said input connector means including a microstrip line;
   microwave energy absorbing means positioned to absorb spurious resonant microwave emissions from said electro-optic modulator; and
   Chebyshev impedance matching transformer means for coupling the input signal from the input connector means to the modulation electrode means, and matching said output impedance to said input impedance respectively, wherein the impedance matching transformer means comprises a tapered coplanar waveguide transformer and wherein the modulation electrode means is constructed to operate at microwave input signal frequencies, the impedance matching transformer means matching said output impedance to said input impedance at said microwave input signal frequencies.

2. An assembly as in claim 1, in which the energy absorbing means comprises a magnetically loaded epoxide material.

3. An electro-optic modulator assembly, comprising:
   an electro-optic modulator constructed to operate at a microwave electrical input signal frequency having an electrical modulation waveguide electrode means having a predetermined input impedance;
   input connector means for receiving said microwave electrical input signal, and including a microstrip line having a predetermined output impedance which is different from said predetermined input impedance;
   Chebyshev impedance matching transformer means for coupling the input signal from the microstrip line to the waveguide electrode means, and matching said output impedance to said input impedance respectively, said impedance matching transformer means comprising a tapered coplanar waveguide transformer, and impedance matching transformer means comprising a tapered coplanar waveguide transformer, and
   microwave energy absorbing means positioned to absorb spurious resonant microwave emissions generated by said electro-optic modulator, said electro-optic modulator being mounted on said energy absorbing means.

4. An assembly as in claim 3, in which the energy absorbing means comprises a magnetically loaded epoxide material.

5. An assembly as in claim 3 in which the electro-optic modulator comprises a travelling-wave Mach-Zehnder modulator.

6. An assembly as in claim 3, in which the electro-optic modulator comprises a lithium niobate substrate, the energy absorbing means being disposed to absorb spurious resonant microwave emissions from the substrate.

* * * * *